(12) United States Patent
Yen et al.

(10) Patent No.: US 8,419,545 B2
(45) Date of Patent: Apr. 16, 2013

(54) METHOD AND SYSTEM FOR CONTROLLING MOVEMENTS OF OBJECTS IN A VIDEOGAME

(75) Inventors: Wei Yen, Seattle, WA (US); Ian Wright, Montain View, CA (US); Dana Wilkinson, Mountain View, CA (US); Xiaoyuan Tu, Sunnyvale, CA (US); Stuart Reynolds, Mountain View, CA (US); William Robert Powers, III, San Francisco, CA (US); Charles Musick, Jr., Belmont, CA (US); John Funge, Sunnyvale, CA (US)

(73) Assignee: AiLive, Inc., Mountain View, CA (US)

( * ) Notice: Subject to any disclaimer, the term of this patent is extended or adjusted under 35 U.S.C. 154(b) by 541 days.

(21) Appl. No.: 12/430,096

(22) Filed: Apr. 26, 2009

(65) Prior Publication Data
US 2009/0221374 A1 Sep. 3, 2009

Related U.S. Application Data

(63) Continuation-in-part of application No. 12/020,431, filed on Jan. 25, 2008.

(60) Provisional application No. 60/990,898, filed on Nov. 28, 2007.

(51) Int. Cl.
*A63F 9/24* (2006.01)

(52) U.S. Cl.
USPC .......................................................... 463/42

(58) Field of Classification Search ................ 463/42
See application file for complete search history.

(56) References Cited

U.S. PATENT DOCUMENTS

| 6,308,565 B1 * | 10/2001 | French et al. ............ 73/379.04 |
| 7,864,168 B2 * | 1/2011 | French ........................ 345/204 |
| 2007/0213127 A1 * | 9/2007 | Sato ............................. 463/36 |

* cited by examiner

*Primary Examiner* — Yu-Hsi D Sun
(74) *Attorney, Agent, or Firm* — Joe Zheng

(57) ABSTRACT

Techniques for controlling movements of an object in a videogame are disclosed. At least one video camera is used at a location where at least a player plays the videogame, the video camera captures various movements of the player. A designated device (e.g., a game console or computer) is configured to the video data to derive the movements of the player from the video data, and cause the object to respond to the movements of the player. When the designated device receives video data from more than one locations, players at the respective locations can play a networked videogame that may be built upon a shared space representing some or all of the real-world spaces of the locations. The video game is embedded with objects, some of which respond to the movements of the players and interact with other objects in accordance with rules of the video games.

57 Claims, 13 Drawing Sheets

100

METHOD AND SYSTEM FOR CONTROLLING MOVEMENTS OF OBJECTS IN A VIDEOGAME

CROSS-REFERENCE TO RELATED APPLICATION

This is a continuation-in-part of co-pending U.S. application Ser. No. 12/020,431, entitled "Self-Contained Inertial Navigation System for Interactive Control Using Movable Controllers", filed Jan. 25, 2008, which claims the priority of the following co-pending applications U.S. application Ser. No. 11/486,997, entitled "Generating Motion Recognizers for Arbitrary Motions", filed Jul. 14, 2006, U.S. application Ser. No. 11/820,207, entitled "Generating Motion Recognizers for Arbitrary Motions", filed Jun. 18, 2007, and U.S. Provisional Application 60/990,898, entitled "Generating Motion Recognizers for Arbitrary Motions", filed Nov. 28, 2007.

BACKGROUND OF THE INVENTION

1. Field of Invention

The invention generally is related to the area of computer video gaming, and more particularly related to techniques for creating and interacting with a three-dimensional (3D) game space that is shared over a network. The 3D game space is created and maintained from information about players' morphologies and possibly their real-world environments, where the movements of the players in the real world are interpreted so as to create a shared feeling of physical proximity and physical interaction with other players on the network. Players are able to jointly interact with virtual entities and objects within the 3D game space.

2. Related Art

The Nintendo Wii Remote™ wireless controller is an example of the most recent state of the art advances in user interactive controllers for computer display game systems. It is a movable wireless remote controller hand-held by a user. It uses built-in accelerometers to sense movement, which can be combined with infrared detection to obtain positional information in a 3D space when pointed at LEDs within the reach of a sensor bar. This design allows users to control a game using physical gestures, pointing, and traditional button presses. The controller connects to a console using Bluetooth and features a "rumble pack", that can cause the controller to vibrate, as well as an internal speaker. As a user moves the controller in reacting to a display, the controller transmits sensor data to the console via conventional short range wireless RF transmissions to simulate interactions of the users with the game being displayed.

With the popularity of the Nintendo Wii videogame system, more advanced videogame systems are being sought to get a player more involved in a game being played. The disclosure presented herein describes methods and systems for creating and interacting with three-dimensional (3D) virtual game spaces that are shared over a network. The 3D virtual game space is created, combined or stitched together from information including the capabilities and setup of cameras and inertial sensors, and/or information obtained from cameras and inertial sensors about players and their real world environments. The movements of the players in the real world are detected by cameras and/or inertial sensors and those movements are interpreted so as to create a shared feeling of physical proximity and physical interaction with other players on the network. The movements are typically able to be viewed and allow both joint and solitary interaction with virtual entities and objects within the 3D virtual play area.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

The present invention generally pertains to creating a game space based on one or more real-world spaces of players located separately, where the real-world spaces are combined in different ways to create a game space within which the movements of players in the real-world are interpreted to create a shared feeling of physical proximity and physical interaction with other players on the network.

According to one aspect of the present invention, there is at least one video camera in one play area where there may be one or more players. The video camera capabilities and setup (e.g., its optical characteristics and lighting sensitivities) define an effective play area within which the movements of a player can be tracked with a predefined level of acceptable reliability and some acceptable fidelity for an acceptable duration. The effective play area can optionally be enhanced and/or extended by using INS sensors to help track and identify the players and their movements. A mapping applied to data obtained from the effective play area in the real-world space creates a virtualized 3D representation of the effective play area. The 3D representation is embedded within a game space. When there are more players playing a videogame over a network, more 3D representations of respective real-world spaces are derived. Thus a shared game space is created based on the respective 3D representations of real-world spaces that may be combined in various ways. The camera generates video data capturing the players as well as the environment of the players. The data may be used to derive virtualized 3D representative objects of the player and/or other objects in the real-world spaces. Depending on a particular videogame, the game space is embedded with various virtual objects and the representative objects. Together with various rules and scoring mechanisms, such a videogame can be played by multiple players in a game space within which each player's movements are interpreted to create a shared feeling of physical proximity and physical interaction with other players on the network.

According to another aspect of the present invention, the 3D representations of real-world spaces may be combined in different ways and the mapping that defines the real-world spaces may also be changed, so that the 3D representations can be modified, or morphed over the course of a videogame to create new and interesting scenes for the game. In a typical group video game, there are multiple game consoles, each providing video data and sensor data. A hosting device (either one of the game consoles or a designated computing device) is configured to receive the data and create a game space for the videogame, where the game space is fed back to the participating game consoles for display and interactions by the players. Alternatively, the game space might be stored in some distributed form, for example, on multiple computing devices over a peer-to-peer network.

As a result, the game space may include virtual objects and representative objects representing one or more players and/or layouts and furniture in the real-world space, and allow for interactions among the objects. Some of the representative objects will move in accordance with the movement of the players in the real-world spaces. For example, a player may be represented by an avatar in the game space, the movement of that avatar in the game space being an interpretation of the movements of the player in his/her own real-world space. That interpretation may include various transformations, enhancements, additions and augmentations designed to compensate for missing data, modify a movement that is incompatible with the game, smooth a movement, make a movement more aesthetically pleasing, or make some movements more impressive.

A single play area may also be rendered in non-visual ways. For example, if there is a virtual source of sound in the game space, then the sound the player hears should get louder as an avatar corresponding to the player gets closer to the sound source, and vice versa. The sound that the player hears could come from speakers (e.g., integrated or attached to a display screen) or from a controller the player is using. The sound could also be modulated by the position and orientation of the controller. For example, the controller could play the role of positioning and orienting a virtual microphone in the game space.

The invention can also be used to localize a sound in the real-world environment. The invention may provide the game with information on at least the approximate location of the players. For example, if there are two players in front of one camera, then by correlating the data from the cameras and game controllers the locations of the players could be approximately determined. A microphone array could then be used to capture sound from the environment and the location information could be used to separate out the separated speech and sounds of the two players from each other and from other background noises. This capability could be for voice recognition or to allow players in remote locations to choose to listen to only one of the players at the location with two players.

A controller often contains "rumble packs" that cause the controller to vibrate. The vibration could be modulated by the position and orientation of the controller being used by a player. The vibration could also be modified by the position and orientation of an object representing the player. For example, in a sword fighting game, the controller could vibrate if two virtual blades are crossed, with the degree of vibration being a function of the virtual force calculated to have been imparted to the virtual blades.

Depending on implementation, the present invention may be implemented as a method, an apparatus or part of a system. According to one embodiment, it is a method for creating a shared game space for a networked videogame, the method comprises receiving one or more data streams pertaining to one or more real-world spaces that are not necessarily co-located, each of the data streams including video data pertaining to one of the real-world spaces in which at least a player plays the networked videogame, the video data being used to derive various movements of the player; and creating the shared game space in reference to the 3D representations of the real-world spaces, wherein movements of at least some of objects in the video game are responsive to respective movements of players respectively in the real-world spaces.

According to another embodiment, the present invention is a system for creating a shared game space for a networked videogame, the system comprising: a plurality of play areas that are not necessarily co-located and provide respective data streams, each of the play areas equipped with at least one camera and a console, the camera being set up to monitor the play area in which there is at least one player holding a controller to play the shared game, and the console providing one of the data streams that includes both video and sensor data capturing various movements of the player; and a hosting machine configured to receive the data streams from the play areas and to create the shared game space in reference to 3D representations of real-world spaces of the play areas, wherein movements of at least some of objects in the video game are responsive to respective movements of players respectively in the real-world spaces.

According to still another embodiment, the present invention is a method for controlling movements of two or more objects in a shared game space for a networked videogame being played by at least two players separately located from each other, the method comprises: receiving at least a first video stream from at least a first camera associated with a first location capturing movements of at least a first player at the first location, and a second video stream from at least a second camera associated with a second location capturing movements of at least a second player at the second location; deriving the movements of the first and second players respectively from the first and second video data streams; causing at least a first object in the shared game space to respond to the derived movements of the first player and at least a second object in the shared game space to respond to the derived movements of the second player, wherein the first and second locations are not necessarily co-located; and displaying a depiction of the shared space on at least one display of each of the first and second locations.

According to yet another embodiment, the present invention is a method for controlling movements of an object in a videogame, the method comprises: receiving at least one video stream from a video camera capturing various movements of a player of the videogame; deriving the movements of the player from the video data; and causing the object to respond to the movements of the player. The method further comprises: mapping the movements of the player to motions of the object in accordance with a predefined rule in the videogame.

Other objects, features, benefits and advantages, together with the foregoing, are attained in the exercise of the invention in the following description and resulting in the embodiment illustrated in the accompanying drawings.

BRIEF DESCRIPTION OF THE FIGURES

These and other features, aspects, and advantages of the present invention will be better understood with regard to the following description, appended claims, and accompanying drawings where:

FIG. 2A shows an exemplary game space that is composed to resemble a real-world space in which a player is in;

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1A:
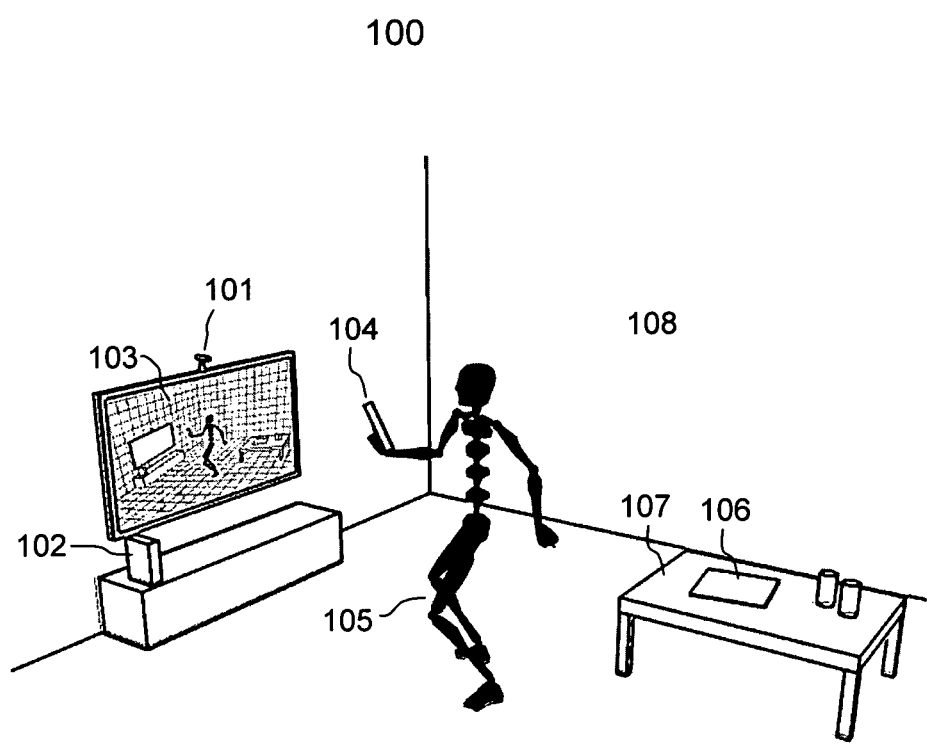
FIG. 1A shows an exemplary configuration for one embodiment of the current invention.

Referring now to the drawings, in which like numerals refer to like parts throughout the several views. FIG. 1A shows an exemplary configuration 100 for one embodiment of the current invention. The configuration 100 resembles a living room in which a player 105 is playing a videogame via a game console 102 and a display 103. A camera 101 is monitoring the player 105. The camera 101 may be an active or passive infra-red camera, or a camera that responds to visible light only (or the camera 101 may be capable of operating in different modes). The camera 101 may also include regular or infra-red lights to help illuminate the scene, or there may be separate lights to illuminate the scene being monitored by the camera 101. The camera 101 may also include the ability to measure time-of-flight information in order to determine depth information. The camera 101 may also consist of one or more cameras so that stereoscopic vision techniques can be applied. The camera may be motorized (perhaps with auto-focus capability) to be able to follow a player within a predefined range to capture the movements of the player.

Depending on implementation, the game console 102 may be a dedicated computer device (e.g., a videogame system like Wii system) or a regular computer configured to run as a videogame system. The game console 102 may be a virtual machine running on a PC elsewhere. In one embodiment, the motion-sensitive device 104 used as a controller may also be embedded with necessary capabilities to execute a game. The player may have two separate motion-sensitive controllers, one in each hand. In another embodiment, a mobile phone/PDA may be configured to act as a motion sensitive device. In still another embodiment, the motion sensitive device might be embedded in a garment that the player wears, or it might be in a hat, or strapped to the body, or attached to the body by various means. Alternatively, there may be multiple motion sensitive devices attached to different parts of the body.

Unless specifically stated, a game console as used in the disclosure herein may mean any one of a dedicated base unit for a videogame, a generic computer running a gaming software module or a portable device configured to act as a base unit for a videogame. In reality, the game console 102 does not have to be in the vicinity of the display 103 and may communicate with the display 103 via a wired or wireless network. For example, the game console 102 may be a virtual console running on a computing device communicating with the display 103 wirelessly using a protocol such as wireless HDMI. According to one embodiment, the game console is a network-capable box that receives various data (e.g., image and sensor data) and transports the data to a server. In return, the game console receives constantly updated display data from the server that is configured to integrate the data and create/update the game space for a network game being played by a plurality of other participating game consoles.

It should be noted that the current invention is described for video games. Those skilled in the art may appreciate that the embodiments of the current invention may applicable in other non-game applications to create a shared feeling of physical proximity and physical interaction over a network among one or more people who are actually far apart. For example, a rendezvous may be created among some users registered with a social networking website for various activities. Video conferencing could be enhanced or phone calls between friends and families could be enhanced by providing the feeling that an absent person may be made present in a virtual 3D space created by using one embodiment of the present invention. Likewise, various collaborations on virtual projects such as building 3D virtual words and engineering design could be realized in a virtual 3D space created by using one embodiment of the present invention. For some applications, a motion-sensitive controller may be unnecessary and the camera-based motion tracking alone could be sufficient.

Figure 1B:
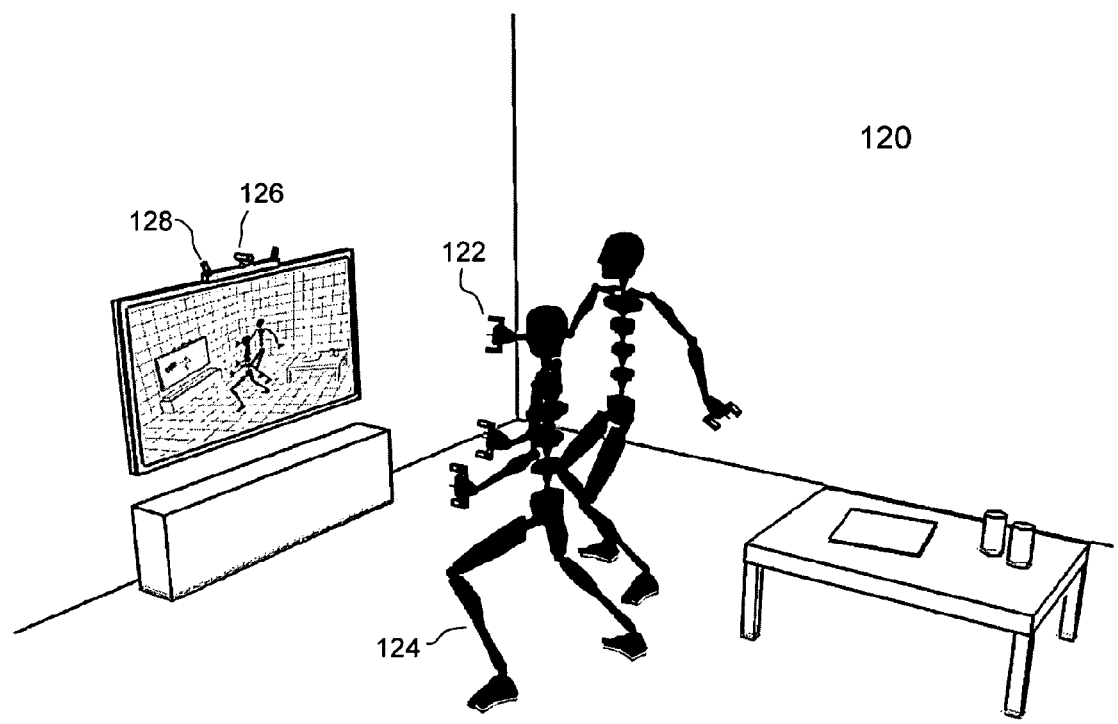
FIG. 1B shows that there are two players playing a video game together at one location.

FIG. 1B shows that there are two players 122 and 124 playing a video game together. A camera 126 is monitoring both of the players 122 and 124. According to one embodiment, each of the players 122 and 124 are holding two controllers, one in each hand. To make it easy to distinguish one from another, each of the controllers has one or more (infra-red) LEDs thereon. The camera 126 may also be an infra-red (or other non-visible light) camera. In another embodiment, more cameras are used. Examples of the cameras include an infra-red (or other non-visible light) camera and a visible light camera. Alternatively, a single camera capable of operating in different modes, visible-light mode and/or infra-red mode (or other non-visible light) may also be used. In still another embodiment, there are lights 128 to help illuminate the scene so as to ameliorate problematic variations in lighting. The lights might be infra-red (or other non-visible light). The lights might also be strobe lights so as to create different lightings of the same scene. The movements of the controllers are used to control corresponding movements of objects in the videogame and/or the movements of the players are used to control movements of the objects respectively corresponding to the players.

Figure 1C:
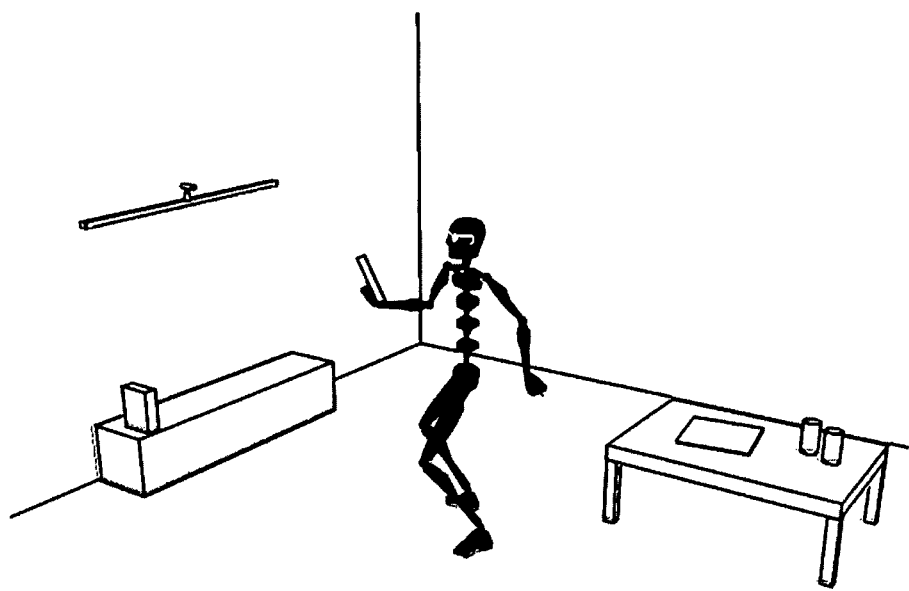
FIG. 1C shows a player wearing virtual reality (VR) goggles/glasses with a display that possibly supports augmented reality.

FIG. 1C shows an embodiment in which a player 105 wears virtual reality (VR) goggles/glasses with display/augmented reality (e.g., available from a website www.vuzix.com). Instead of looking at the display 103, the player 105 may interact with a videogame being displayed in the goggles/glasses. The player may also use 3D glasses to view an external display. Or the display may be an autostereoscopic display or a 3D holographic display. According to one embodiment, the game console, the display, and the controller are all part of the same device or system.

Referring back to FIG. 1A, the motion sensitive device 104, or simply a controller, may include at least two inertial sensors, one being a tri-axis accelerometer and the other being a tri-axis gyroscope. An accelerometer is a device for measuring acceleration along one or more axes at a point on a moving object. A gyroscope is a device for measuring angular velocity around one or more axes at a point on a rotating object. Besides accelerometers and gyroscopes, there are other inertial sensors that maybe used in the controller 104. Examples of such inertial sensors include a compass and a magnetometer. In general, signals from the inertial sensors (i.e., sensor data) are electronically captured and transmitted to a base unit (e.g., a game console 102) to derive a kind of relative movement of the controller 104.

Depending on the implementation, sensor signals from the inertial sensors may or may not be sufficient to derive all six relative translational and angular motions of the motion sensitive device 104. In one embodiment, the motion sensitive device 104 includes inertial sensors that are less than a required number of inertial sensors to derive all relative six translational and angular motions, in which case the motion sensitive device 104 may only detect and track some but not all of the six translational and angular motions (e.g., there are only three inertial sensors therein). In another embodiment, the motion sensitive device 104 includes inertial sensors that are at least equal to or more than a required number of inertial sensors that are needed to derive all six relative translational and angular motions, in which case the motion sensitive device 104 may detect and track all of the six translational and angular motions (e.g., there are at least six inertial sensors therein).

In any case, a camera 101 is provided to image the player 105 and his/her surrounding environment. The image data may be used to empirically derive the effective play area. For example, when the player is out of the effective play area then the maximum extent of the effective play area can be determined. The effective play area can be used to determine a 3D representation of a real-world space in which the player plays a videogame.

Other factors known in advance about the camera might be used in determining the effective play area, for example, a field of view. Alternatively, there may be a separate calibration phase based on empirical data to define an effective play area.

Those skilled in the art know that there are number of ways to derive a 3D representation of a 3D space from image data, one of which may be used to derive such a 3D representation. Further, the image data may be used to facilitate the determination of absolute motions of the controller in conjunction with the sensor data from the inertial sensor. According to one embodiment, the player may wear or be attached with a number of specially color tags, or dots, or lights, to facilitate the determination of the movements of the player from the image data.

Figure 2A:
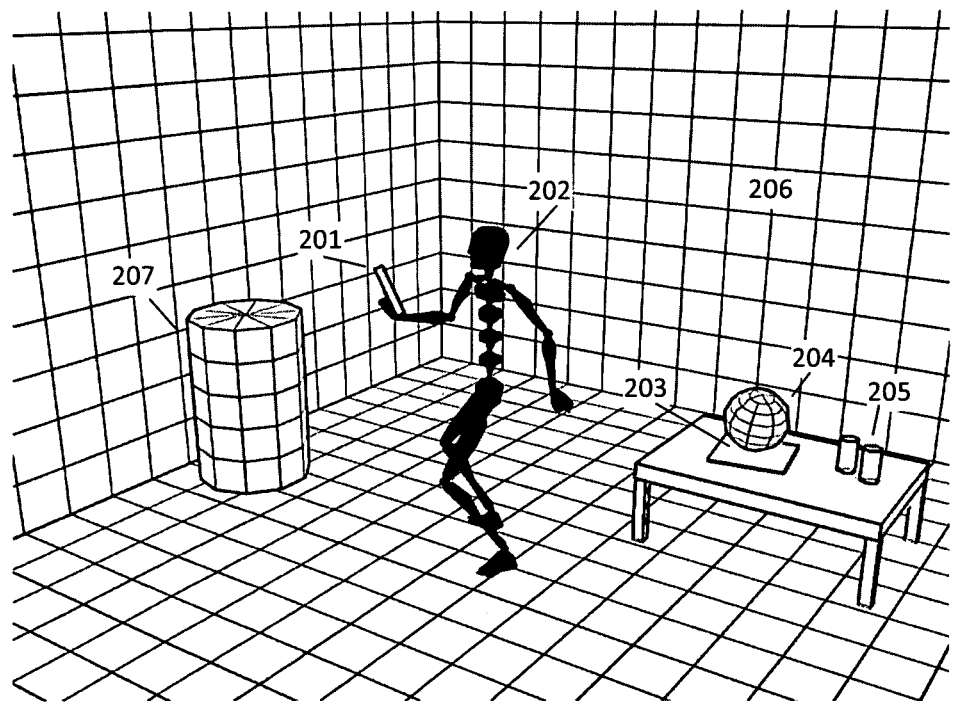

FIG. 2A shows an exemplary game space 200 that is composed to resemble a real-world space in which a player is in. The game space 200 resembling the real-world of FIG. 1A includes a number of objects 203-207, some of them (e.g., referenced by 203 and 205) corresponding to actual objects in the real-world space while others (e.g., referenced by 204 and 207) are artificially placed in the game space 200 for the gaming purpose. The game space 200 also includes an object 202 holding something 201 that may correspond to the player holding a controller. Movement in the game space 200, also called a 3D virtual world, resembles movement in the real-world the player is in, but includes various objects to make a game space for a videogame.

Figure 2B:
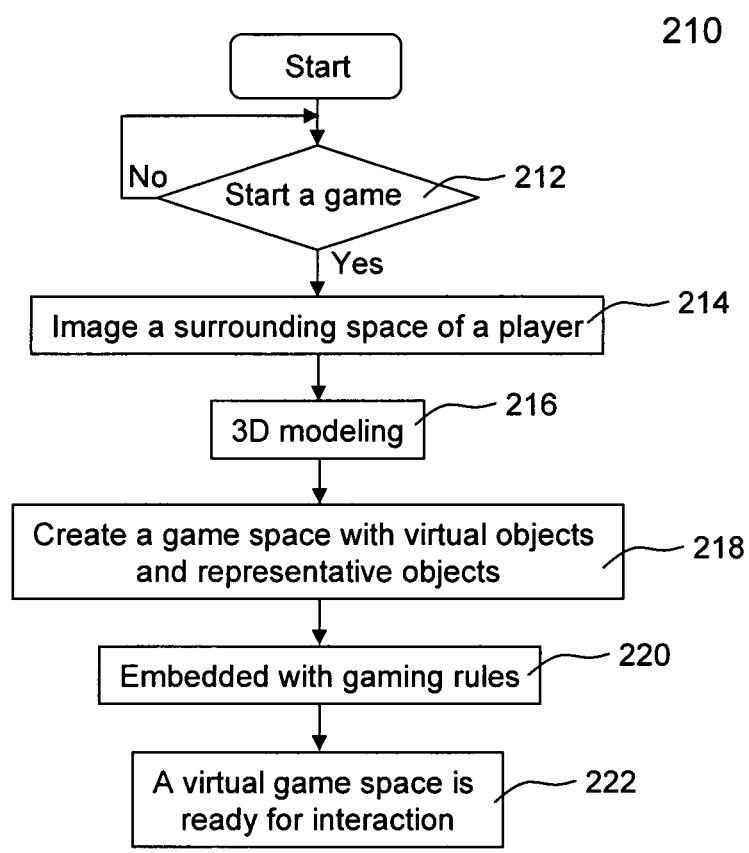
FIG. 2B shows a flowchart or process 210 of generating a game space resembling a real-world space including and surrounding one or more players.

FIG. 2B shows a flowchart or process 210 of generating a game space resembling a real-world space including and surrounding one or more players. The process 210 may be implemented in software, hardware or a combination of software and hardware. According to one embodiment, the process 210 is started when a player has decided to start a videogame at 212. In accordance with the setting illustrated in FIG. 1A, the camera operates to image the environment surrounding the player at 214. The camera may be a 3D camera or a stereo-camera system generating data that can be used to reconstruct a 3D image or representation of the real-world of the player at 216. Those skilled in the art know that there are different ways to generate a 3D representation of a 3D real-world or movements of a player in the 3D real-word space, the details of which are omitted herein to avoid obscuring aspects of the current invention.

At 218, with the 3D representation of the real-world, a game space is created to include virtual objects and representative objects. The virtual objects are those that do not correspond to anything in the real-world, examples of virtual objects include icons that may be picked up for scores or various weapons that may be picked up to fight against other objects or figures. The representative objects are those that correspond to something in the real-word, examples of the representative objects include an object corresponding to a player(s) (e.g. avatar(s)) or major things (e.g., tables) in the real-world of the player. The representative objects may also be predefined. For example, a game is shipped with a game character that is designated to be the player's avatar. The avatar moves in response to the player's real-world movements, but there is otherwise no other correspondence. Alternatively, a pre-defined avatar might be modified by video data. For example, the player's face might be applied to the avatar as a texture, or the avatar might be scaled according to the player's own body dimensions. At 220, depending on an exact game, various rules or scoring mechanisms are embedded in a videogame using the game space to set objectives, various interactions that may happen among different objects and ways to count score or declare an outcome. A videogame using the created game space somehow resembling the real-world of the player is ready to play at 222. It should be noted that the process 210 may be performed in a game console or any other computing device executing a videogame, such as a mobile phone, a PC or a remote server.

Figure 3A:
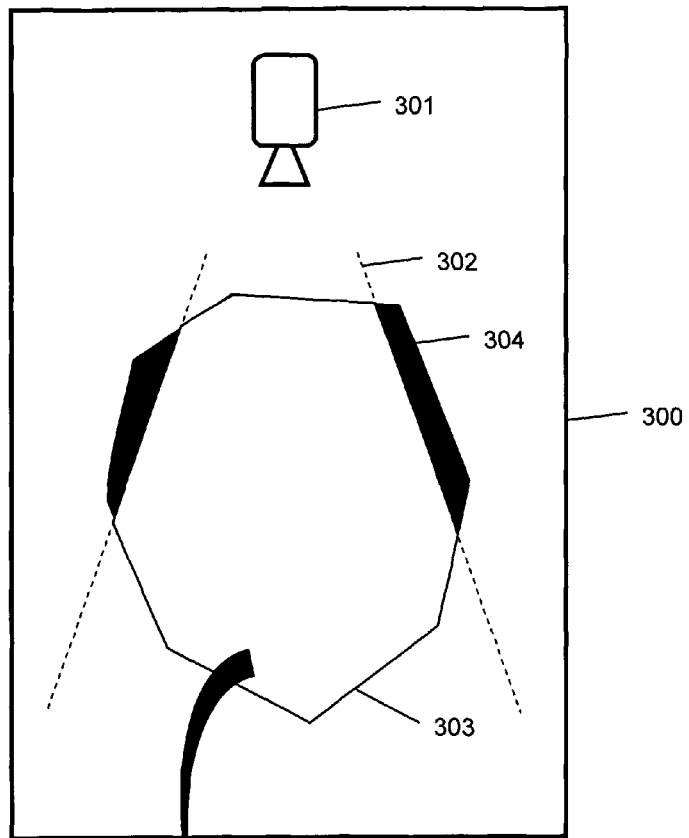
FIG. 3A shows a configuration according to one embodiment of this invention.
Figure 3A:
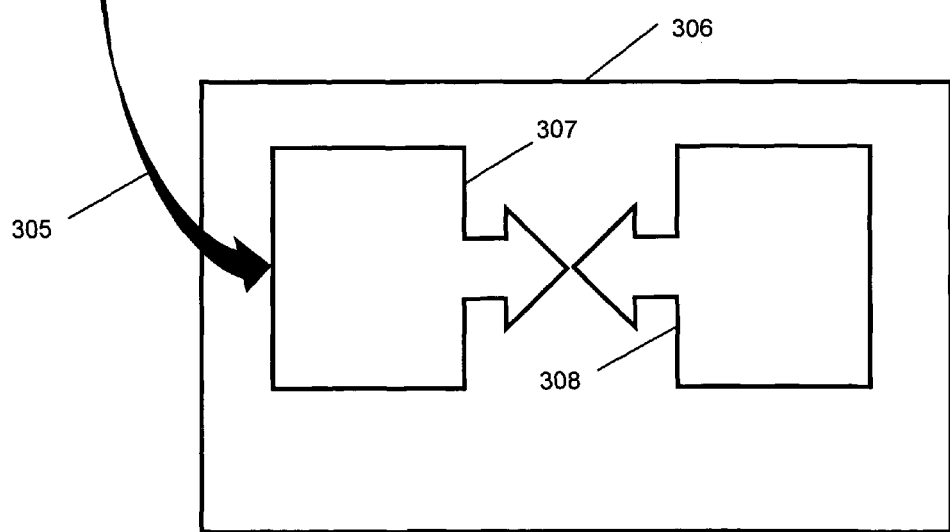

One of the features, objects and advantages in the current invention is the ability to create a gaming space in which there is at least an approximate correspondence between a game object and a corresponding player in his/her own real-world space in terms of, for example, one or more of action, movement, location and orientation. The gaming space is possibly populated with avatars that move as the player does, or as other people do. FIG. 3A shows a configuration 300 according to one embodiment of this invention. A camera 301 is placed in a play area surrounding one player, and the play area may be in a living room, or bedroom, or any suitable area. In one set-up, a player may have multiple cameras in his/her house, for example, one in the living room and another in the bedroom. As the player moves around the house and is recognized as being visible by different cameras, the game space is updated in accordance with the change of the real-world space, and could reflect a current location of the player in some manner.

The camera 301 has a field of view 302. Depending on factors that include the camera parameters, the camera setup, the camera calibration, and lighting conditions, there is an effective play area 303 within which the movements of the player can be tracked with a predefined level of reliability and fidelity for an acceptable duration. The effective play area 303 can optionally be enhanced and/or extended 304 by using INS sensors to help track and identify players and their movements. The effective play area 303 essentially defines a space in which the player can move and the movements thereof may be imaged and derived for interacting with the videogame. It should be noted that an effective play area 303 typically contains a single player, but depending on the game and tracking capabilities, may contain one or more players.

The effective play area 303 may change over time. For example, as lighting conditions change, or as the camera is moved or re-calibrated. The effective play area 303 may be determined from many factors such as simple optical properties of the camera (e.g., the field of view, or focal length). Experimentation may also be required to pre-determine likely effective play areas. Or the effective play area may be implicitly determined during the game or explicitly determined during a calibration phase in which the player is asked to perform various tasks at various points in order to map out the effective play area.

A mapping 305 specifies some transformation, warping, or morphing of the effective play area 303 into a virtualized 3D representation 307 of the effective play area 303. The 3D representation 307 may be snapped or clipped into some idealized regular shape or, if present, may preserve some or the irregular shape of the original real-world play area. There may also be more than one 3D representation. For example, there may be different representations for different players, or for different parts of the play area with different tracking accuracies, or for different games, or different parts of a game. There might also be more than one representation of a single player. For example, the player might play the role of the hero in one part of the game, and of the hero's enemy in a different part of the game, or a player might choose to control different members of a party of characters, switching freely between them as the game is played.

The 3D representation is embedded in the shared game space 306. Another 3D representation 308 of other real-world spaces is also embedded in the game space 306. These other 3D representations (only 3D representations 308 are shown) are typically of real-world spaces that are located remotely, physically far apart from one another or physically apart under the same roof.

Those skilled in the art will realize that the 3D representation and/or embedding may be implicit in some function that is applied to the image and/or sensor data streams. The function effectively re-interprets the data stream in the context of the game space. For example, it is supposed that an avatar corresponding to a player is in a room of dimensions a×b×c then this could be made to correspond to a bounding box around the player of unit dimension. So if the player moves half-way across the effective play area in the x-dimension, then the avatar moves a/2 units in the game space.

Figure 3B:
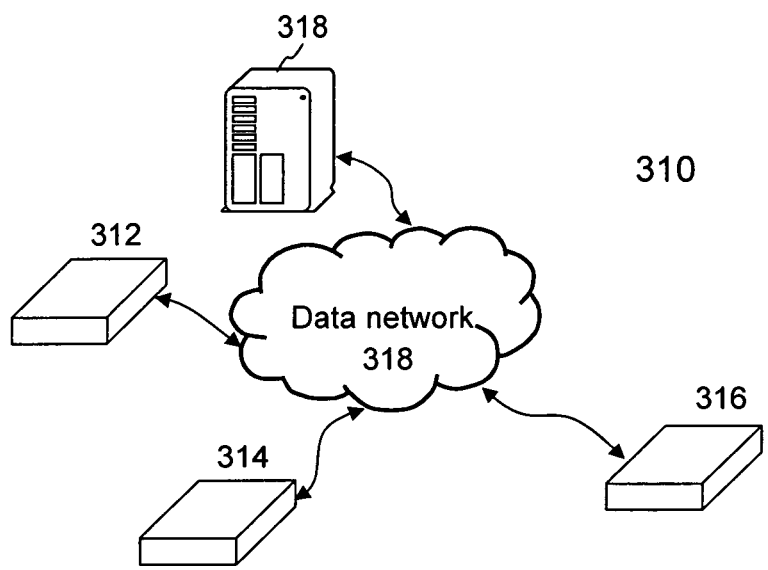
FIG. 3B shows a system configuration that may be used to create a game space based on data from a plurality of data streams coming from at least two game consoles.

FIG. 3B shows a system configuration 310 that may be used to create a game space based on data from a plurality of data coming from at least two game consoles. There are three exemplary game consoles 312, 314 and 316 in FIG. 3B. Each of the game consoles 312, 314 and 316 is coupled to at least one camera and possibly a motion-sensitive controller, thus providing image data and sensor data. According to one embodiment, each of the game consoles 312, 314 and 316 is coupled to a data network. In one embodiment, each of the game consoles 312, 314 and 316 is equipped with a WiFi interface allowing a wireless connection to the Internet. In another embodiment, each of the game consoles 312, 314 and 316 is equipped with an Ethernet interface allowing wired connection to the Internet. In operation, one of the game consoles 312, 314 and 316 is configured as a hosting machine executing a software module implementing one embodiment of the present invention.

The mapping from the effective play areas required to create the 3D representations of the play areas may be applied on one or more of the participating consoles or a designated computing device. In one embodiment, the relevant parameters (e.g., camera parameters, camera calibration, lighting) are communicated to a hosting machine where the mapping takes place. The hosting machine is configured to determine how to embed each of the 3D representations into the game space.

The hosting machine receives the (image and/or sensor) data streams from all the participating game consoles and updates a game space based on the received data. Depending on where the mapping takes place, the data streams will either have been transformed on the console, or need to be transformed on the hosting machine. In the context of the present invention, the game space contains at least a virtualized 3D representation of the real-world space within which the movements of the players in the real-world are interpreted as movements of game world objects that resemble those of players on the networked game, where their game consoles are participating. Depending on which game is being played or even for different points in the same game, the 3D representations of the real-world spaces are combined in different ways with different rules, for example, stitching, merging or warping the available 3D representations of the real-world spaces. The created game space is also embedded with various rules and scoring mechanisms that may be predefined according to a game theme. The hosting game console feeds the created game space to each of the participating game consoles for the player to play the videogame. Those skilled in the art can appreciate that one of the advantages, benefits and advantages in the present invention is that the movements of all players in their real-world spaces are interpreted naturally within the game space to create a shared feeling of physical proximity and physical interaction.

Figure 3C:
FIG. 3C shows an exemplary game space incorporating two real-world spaces of two participating players that may be physically apart remotely or in separate rooms under one roof.

FIG. 3C shows an exemplary game space 320 incorporating two real-world spaces of two participating players that may be physically apart remotely or in separate rooms under one roof. The game space 320 created based on a combination of two real-world spaces of two participating players includes various objects, some corresponding to the actual objects in the real-world spaces and others are artificially added to enhance the game space 320 for various actions or interactions. As an example, the game space 320 includes two different levels, the setting on the first floor may be from one real-world space and the setting on the second floor may be from another real-world space, a stair is artificially created to connect the two levels. The game space 320 further includes two objects or avatars 322 and 324, each corresponding to one of the players. The avatars 322 and 324 move in accordance with the movements of players, respectively. In one embodiment, one of the avatars 322 and 324 may hold a widget (e.g., a weapon or sword) and may wave the widget in accordance with the movement of the controller by the corresponding player. Given the game space 230, each of the avatars 322 and 324 may be manipulated to enter or move on each of the two levels and interact with each other and other objects on the either one of the two levels.

Referring back to FIG. 3B, according to another embodiment, instead of having one of the game consoles 312, 314 and 316 act as a hosting machine, a server computer 318 is provided as a hosting machine to receive all (image and sensor) data streams from the participating game consoles 312, 314 and 316. The server computer 318 executes a software module to create and update a game space based on the received data streams. The participating consoles 312, 314 and 316 may also be running on some other remote server, or on some computing devices located elsewhere. In the context of the present invention, movements in the game space resemble the movements of the players within a real-world space combining part or all of the real-world space of each of the players whose game console is participating. Depending on an exact game or even the exact phase in a game, the 3D representations of the real-world spaces are combined in different ways with different rules for gaming, for example, stitching, merging or warping two or more 3D representations of the real-world spaces. The server computer 318 feeds the created game space to each of the participating game consoles, or other interested party, to play the videogame jointly. As a result, not only do those participating players play in the videogame with a shared feeling of physical proximity and physical interaction, but other game players may be invited to view or play the videogame as well.

Figure 3D:
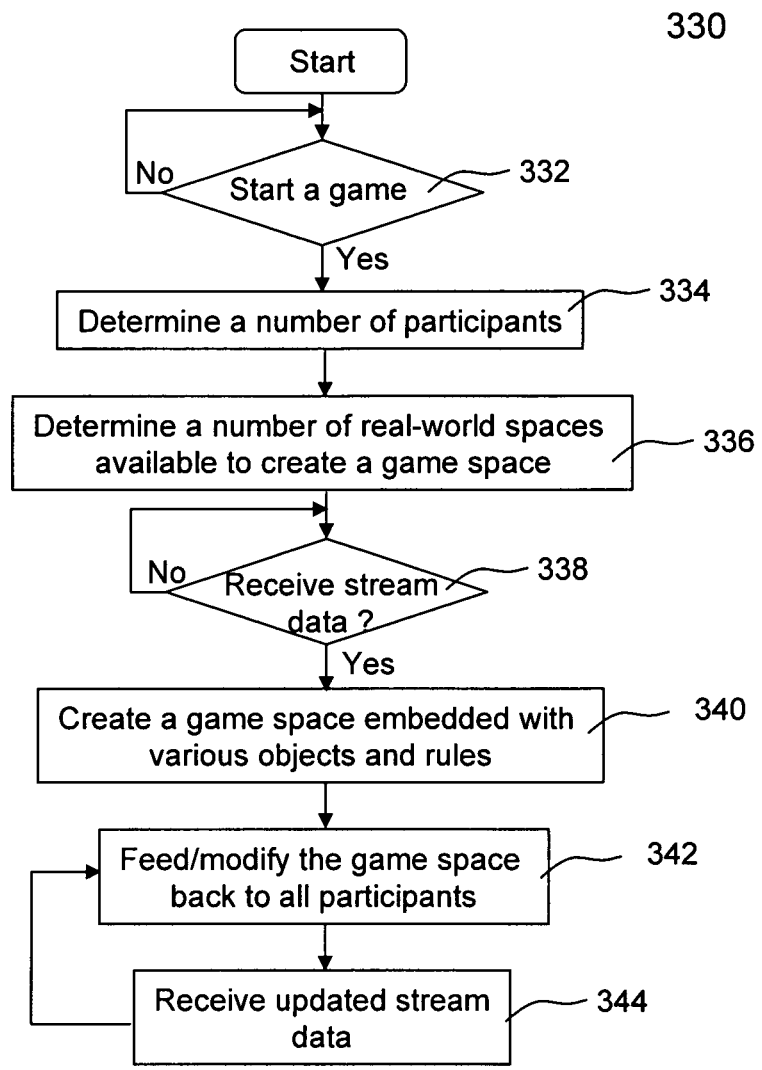
FIG. 3D shows a flowchart or process of generating a game space combining one or more real-world spaces respectively surrounding participating players.

FIG. 3D shows a flowchart or process 330 of generating a game space combining one or more real-world spaces respectively surrounding participating players. The process 330 may be implemented in software, hardware or a combination of software and hardware. According to one embodiment, the process 330 is started when one or more players have decided to start a videogame at 332.

As described above, each of the players is ready to play the videogame in front of at least one camera being set up to image a player and his/her surrounding space (real-world space). It is assumed that each of the players is holding a motion-sensitive controller, or is wearing, or has attached to their body at least one set of inertial sensors. In some embodiments, it is expected that the motion-sensing device or sensors may be unnecessary. There can be cases that two or more players are at one place in which case special settings may be used to facilitate the separation of the players, for example, each of the players may wear or have attached one or more specially colored tags, or their controllers may be labeled differently in appearance, or the controllers may include lights that glow with different colors.

At 334, the number of game players is determined. It should be noted that the number of game players may be different from the number of players that are participating in their own real-world spaces. For example, there may be three game players, two are together being imaged in one participating real-world space, and the third one is alone. As a result, there are two real-world spaces to be used to create a game space for the video game. Accordingly, such a number of real-world spaces is determined at 336.

At 338, a data stream representing a real-word space must be received. In one embodiment, two game consoles are used, each at one location and being connected to a camera imaging one real-world space surrounding a player(s). It is assumed that one of the game consoles is set as a hosting game console to receive two data streams, one from a remote and the other from itself. Alternatively, each console is configured to maintain a separate copy of the game space that they update with information from the other console as often as possible to maintain a reasonably close correspondence. If one of the two data streams is not received, the process 330 may wait or proceed with only one data stream. If there is only one data stream coming, the game space would temporarily be built upon one real-word space. In an event of data missing, for example, a player performs a sword swipe and the data for the torso movement may be missing or incomplete, the game will be filled in with movements of some context-dependent motion it decides suitable, may enhance the motion to make the sword stroke look more impressive, or may subtlety modify the sword stroke so that it makes contact with an opponent character in the case that the stroke might otherwise have missed the target.

At 340 a game space is created by embedding respective 3D representations of real-world spaces in a variety of possible ways that may include one or any combination of stitching 3D representations together, superimposing or morphing, or any other mathematical transformation. Transformations (e.g., morphing) may be applied before the 3D representations are embedded, possibly followed by image processing to make the game space look smooth and more realistic looking. Exemplary transformations include translation, projection, rotation about any axis, scaling, shearing, reflection, or any other mathematical transformation. The combined 3D representations may be projected onto 2 of the 3 dimensions. The projection onto 2 dimensions may also be applied to the 3D representations before they are combined. The game space is also embedded with various other structures or scenes, virtual or representative objects and rules for interactions among the objects. At this time, the videogame is ready to play as the game space is being sent back to the game consoles and registered to jointly play the videogame.

Figure 3E:
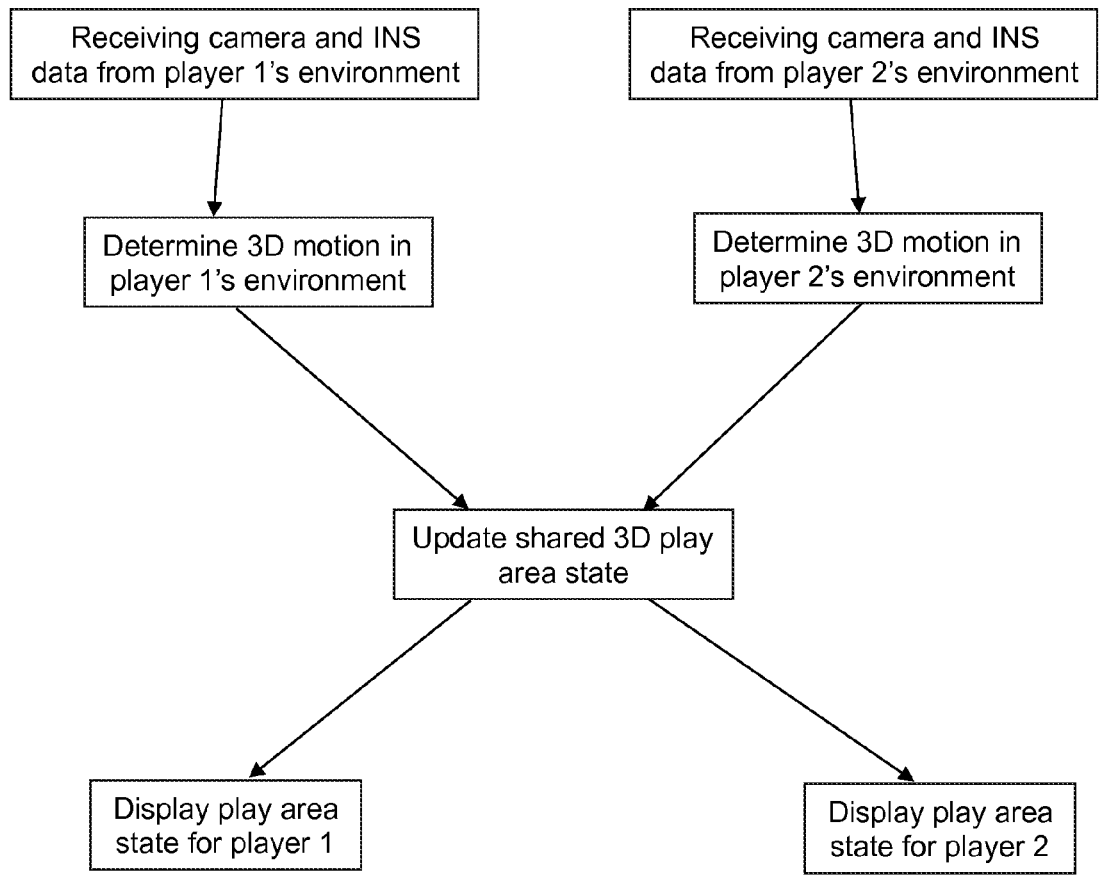
FIG. 3E provides an illustration of creating a game space based on two real-world spaces of two separate play areas.

As the videogame is being played, the image and sensor data keeps feeding from the respective game consoles to the host game console that updates the game space at 342 in reference to the data so that the game space being displayed is updated in a timely manner. At 344, as the data is being received from the respective game consoles, the game space is constantly updated at 342. FIG. 3E provides an illustration of creating a game space based on two real-world spaces of two separate play areas, which can be readily modified to generalize to multiple real-world spaces.

Figure 3F:
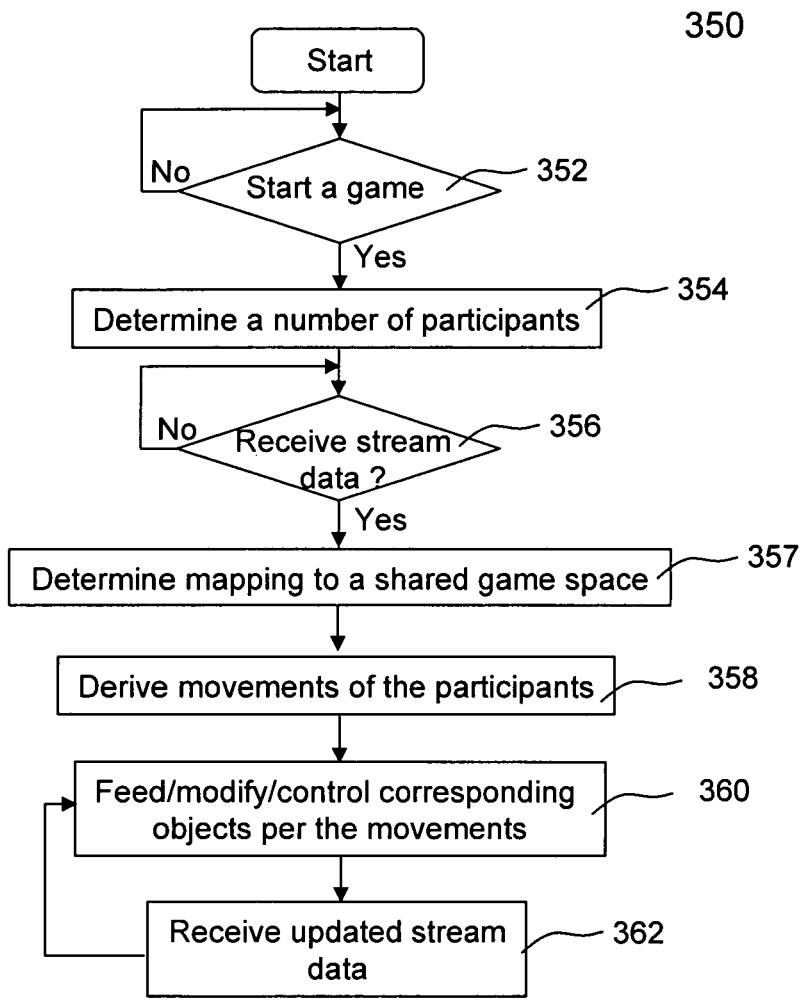
FIG. 3F shows a flowchart or process of controlling representative objects in a network game, where the representative objects move in accordance with the movements of the corresponding players.

FIG. 3F shows a flowchart or process 350 of controlling representative objects in a networked game, where at least some of the representative objects move in accordance with the movements of the corresponding players. The process 350 may be implemented in software, hardware or a combination of software and hardware. According to one embodiment, the process 350 is started when one or more players have decided to start a videogame at 352.

As described above, each of the players is ready to play the videogame in front of at least one camera being set up to image a player and his/her surrounding space (real-world space). It is assumed that each of the players is holding a motion-sensitive controller or is wearing, or has attached to their body, at least one set of inertial sensors. In some embodiments it is expected that the motion-sensing device or sensors may be unnecessary. There may be cases where two or more players are at one place in which case special settings may be used to facilitate the separation of the players, for example, each of the players may wear or have attached one or more specially colored tags, or their controllers may be labeled differently in appearance, or the controllers may include lights that glow with different colors.

At 354, the number of game players is determined so as to determine how many representative objects in the game can be controlled. Regardless of where the game is being rendered, there are a number of video data streams coming from the players. However, it should be noted that the number of game players may be different from the number of video data streams that are participating in the game. For example, there may be three game players, two together being imaged by one video camera, and the third one alone being imaged by another video camera. As a result, there are two video data streams from the three players. In one embodiment, a player uses more than one camera to image his/her play area, resulting in multiple video streams from the player for the video game. Accordingly, the number of game players as well as the number of video data streams shall be determined at 354.

At 356, the number of video data streams representing the movements of all the participating players must be received. For example, there are two players located remotely with respect to each other. Two game consoles are used, each at a location and being connected to a camera imaging a player. It is assumed that one of the game consoles is set as a hosting game console (or there is a separate dedicated computing machine) to receive two data streams, one from a remote site and the other from itself. Alternatively, each console is configured to maintain a separate copy of the game space that they update with information from the other console as often as possible to maintain a reasonably close correspondence. If one of the two data streams is not received, the process 356 may wait or proceed with only one data stream. If there is only one data stream coming, the movement of a corresponding representative object will be temporarily taken over by the hosting game console configured to cause the representative object to move in the best interest of the player. In the event of missing data, for example, if a player performs a sword swipe and the data for the torso movement may be missing or incomplete, the game will be filled in with movements of some context-dependent motion it decides is as consistent as possible with the known data. For example, a biomechanically plausible model of a human body and how it can move could be used to constrain the possible motions of unknown elements. There are many known techniques for subsequently selecting a particular motion from a set of plausible motions, techniques such as picking motions that minimize energy consumption or the motion most likely to be faithfully executed by noisy muscle actuators.

At 357, a mapping to a shared game space is determined. The movements of the players need to be somehow embedded in the game space and that embedding is determined. For example, it is assumed that there are 2 players, player A and player B. Player A is playing in his/her living room while player B is remotely located and playing in his/her own living room. As player A moves toward a display (e.g., with a camera on top), the game must decide in advance how that motion is to be interpreted in the shared game space. In a sword fighting game, the game may decide to map the forward motion of player A in the real-world space into rightward motion in the shared game space, backward motion into leftward motion, and so on. Similarly, the game may decide to map the forward motion of player B into leftward motion, backward motion into rightward motion, and so on. The game may further decide to place an object that is representative of player A (e.g., an avatar of player A) to the left of the shared game space and player B's avatar to the right of the space. The result is that as player A moves toward the camera player A, the corresponding avatar moves to the right on the display, closer to player B. If player B moves away from the camera in response, then player A sees that the avatar of player B moves to the right on the display, backing away from the advancing avatar of player A.

Mapping forward motion in the game world to rightward of leftward motion in the shared game space is only one of many possibilities. Any direction of motion in the game may be mapped to a direction in the shared game space. Motion can also be modified in a large variety of other ways. For example, motion could be scaled so that small translations in the real world correspond to large translations in the game world, or vice versa. The scaling could also be non-linear so that small motions are mapped almost faithfully, but large motions are damped.

Any other aspect of a real-world motion could also be mapped. A player may rotate his/her forearm about the elbow joint toward the shoulder, and the corresponding avatar could also rotate its forearm toward its shoulder. Or the avatar may be subject to an "opposite motion" effect from a magic spell so that when the player rotates his/her forearm toward the shoulder, the avatar rotates its forearm away from the shoulder.

The player's real-world motion can also map to other objects. For example, as a player swings his/her arm sideways from the shoulder perhaps that causes a giant frog being controlled to shoot out its tongue. The player's gross-level translational motion of their center of mass may still control the frog's gross-level translational motion of its center of mass in a straightforward way.

Other standard mathematical transformations of one space to another, known to those skilled in the art, could be used; these include, but are not limited to, any kind of reflecting, scaling, translating, rotating, shearing, projecting, or warping.

The transformation applied to the real-world motions can also depend on the game context and the player. For example, in one level of a game, a player's avatar might have to walk on the ceiling with magnetic boots so that the player's actual motion is inverted. But once that level is completed, the inversion mapping is no longer applied to the player's real-world motion. The players might also be able to express preferences on how their motions are mapped. For example, a player might prefer that his/her forward motion is mapped to rightward motion and another player might prefer that his/her motion is mapped to leftward motion. Or a player might decide that his/her avatar is to be on the left of a game space, thus implicitly determining that the forward motion will correspond to a rightward motion. If both players in a two-player game have the same preference, for example, they both want to be on the left of a shared game space, it might be possible to accommodate their wishes with two separate mappings so that on each of their respective displays their avatar's position and movement are displayed as they desire.

Alternatively the game may make some or all of these determinations automatically based on determinations of the player's height, skill, or past preferences. Or the game context might implicitly determine the mapping. For example, if two or more players are on the same team fighting a common enemy monster then all forward motions of the players in the real-world could be mapped to motions of each player's corresponding avatar toward the monster. The direction that is toward the monster may be different for each avatar. In the example, movement to the left or right may not necessarily be determined by the game context so that aspect could still be subject to player choice, or be assigned by the game based on some criteria. All motions should however be consistent. For example, if moving to the left in the real-world space causes a player's avatar to appear to move further away at one instant, then it should not happen, for no good reason, that at another instant the same player's leftward motion in the real world should make the corresponding avatar appear to move closer.

The game can maintain separate mappings for each player and for different parts of the game. The mappings could also be a function of real-world properties such as lighting conditions so that in poor light the motion is mapped with a higher damping factor to alleviate any wild fluctuations caused by inaccurate tracking.

Those skilled in the art would recognize that there are a wide variety of possible representations for the mapping between motion in the real world and motion in the game space. The particular representation chosen is not central to the invention. Some possibilities include representing transformations as matrices that are multiplied together with the position and orientation information from the real-world tracking. Rotations can be represented as matrices, quaternions, Euler angles, or angles and axis. Translations, reflections, scaling, and shearing can all be represented as matrices. Warps and other transformations can be represented as explicit or implicit equations. Another alternative is that the space around the player is explicitly represented as a 3D space (e.g. a bounding box) and the mapping is expressed as the transformation that takes this 3D space into the corresponding 3D space as it is embedded in the game world. The shape of the real-world 3D space could be assumed a priori or it could be an explicitly determined effective play area inferred from properties of the camera, or from some calibration step, or dynamically from the data streams.

Those skilled in the art would recognize that the mapping from real-world motion to game-world motion can potentially be applied at various points, or even spread around and partially applied at more than one point. For example, the raw data from the cameras and motion sensors could be transformed prior to any other processing. In the preferred embodiment the motion of the human players is first extracted from the raw data and then cleaned up using knowledge about typical human motion. Only after the real-world motion has been satisfactorily determined is it mapped onto its game space equivalent. Additional game-dependent mapping may then subsequently be applied. For example, if the player is controlling a spider, the motion in the game space of how the player would have moved had they been embedded in that space instead of the real world is first determined. Only then is any game-specific mapping applied, such as how bipedal movement is mapped to 8 legs, or how certain hand motions might be mapped to special attacks and so forth.

At 358, as the data streams come in, the hosting game console is configured to analyze the video data and infer the respective movements of the players, and at the same time, to cause the corresponding objects representing the players to move accordingly. Depending on an exact game and/or its rules, the movements of the representative objects may be enhanced or modified to make the game look more exciting or to make the players feel more involved. For example, the game may enhance a motion to make a sword stroke look more impressive, or may subtlety modify a sword stroke so that it makes contact with an opponent character in the case where that stroke might otherwise have missed the target.

As the videogame is being played, the video data keeps feeding from the respective game consoles to the host game console that updates/modifies/controls the corresponding objects at 360 and 362.

Figure 4A:
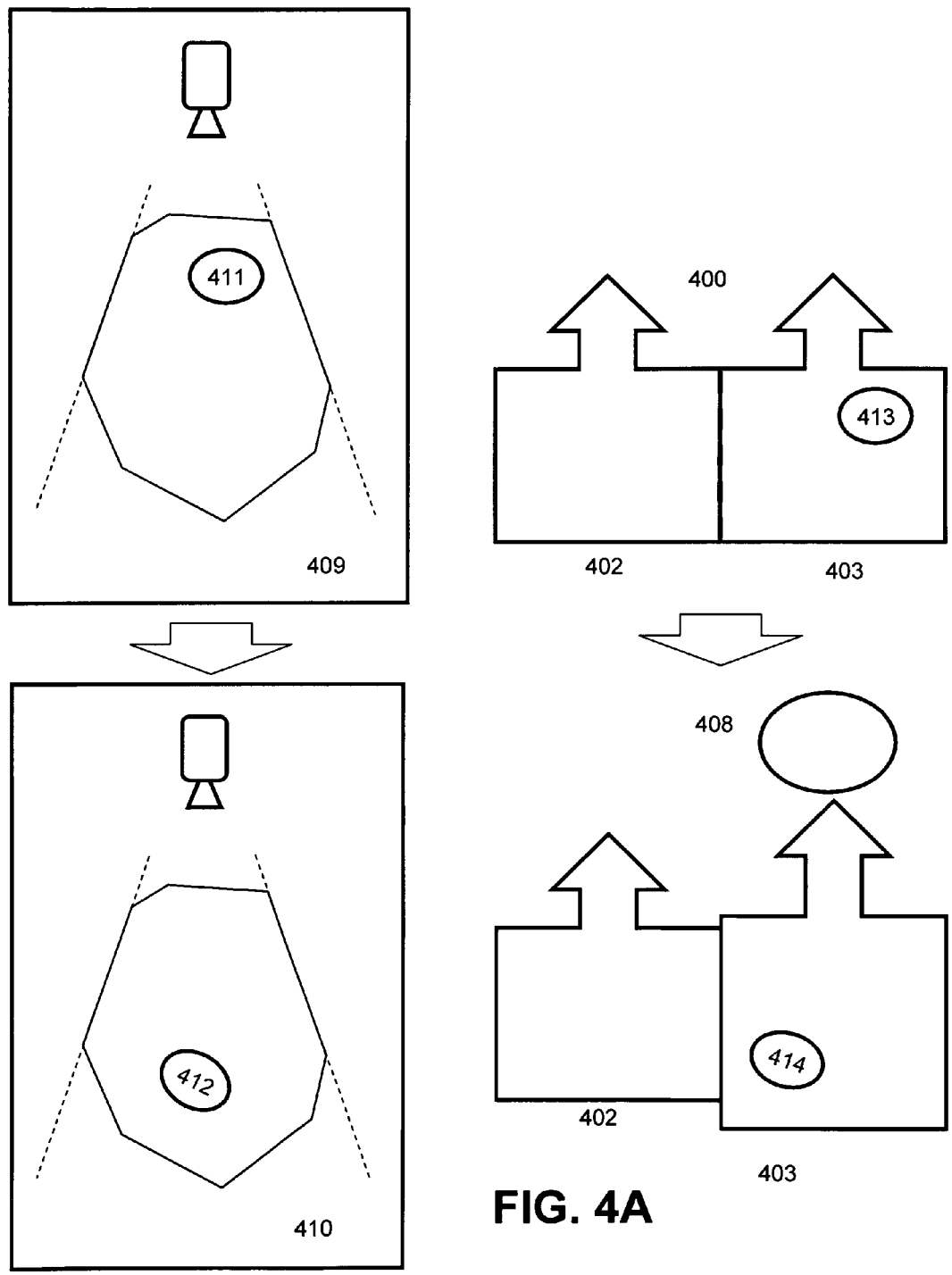
FIG. 4A shows a case in which an artificially added element in a game space causes one of the two players or their corresponding viewing areas to move backwards in his/her real-world space.

Referring now to FIG. 4A, there shows a case 400 in which an artificially added element 408 in a game space may cause one of the two players 411 to physically move backward in their effective play areas to a new location 412. It is assumed that a game space includes two 3D representations 402 and 403 of the real-world play areas that are initially stitched together as shown. As the element 408 (e.g., a monster) is approaching an avatar 413 corresponding to the player, when a player thereof sees the monster approaching (from a display), the player moves backwards to avoid the monster, causing the avatar to reposition 414 in the 3D representation. The player who is in the space represented by the 3D representation 402 will see (from the display) the other player's avatar move back and will feel as if they really are inhabiting the same virtual space together. As a result of a player's movement, it is also possible that a corresponding 3D representation may be changed, for example, it might be made longer so as to dampen the effect of the player's real-world movement.

Figure 4B:
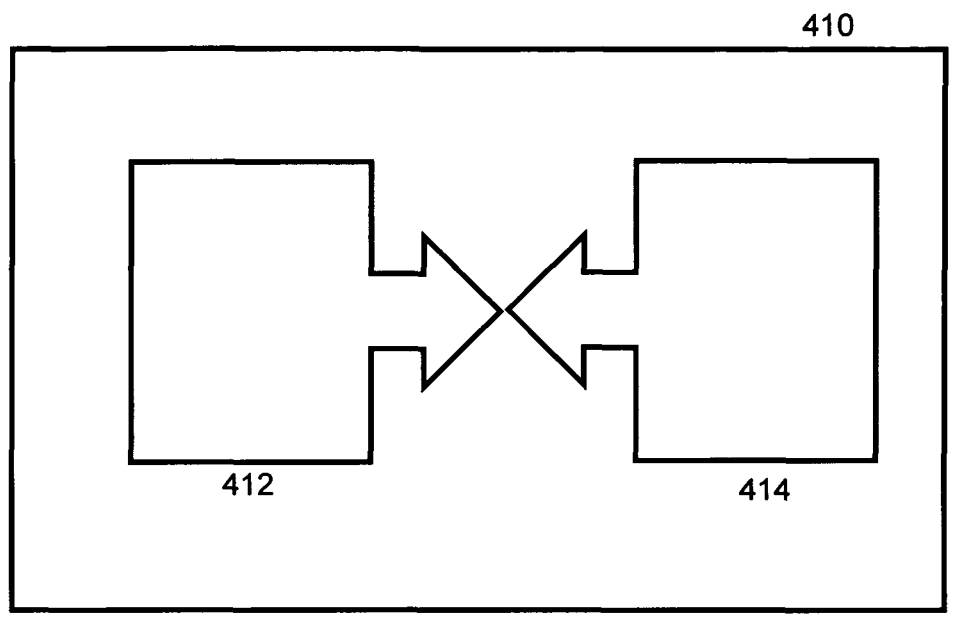
FIG. 4B shows a game space that resembles two real-world spaces or represented by their corresponding viewing areas combined face to face.
Figure 4B:
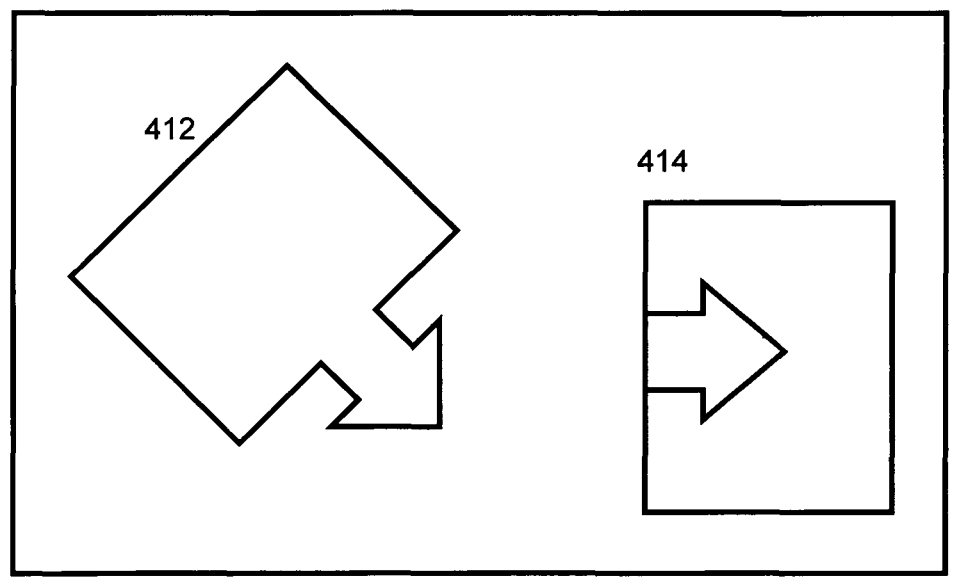

FIG. 4B shows a game space 410 that embeds two 3D representations of two respective real-world play areas 412 and 414, combined face to face. As the player who controls an avatar in 412 moves toward the camera, the avatar will be seen (in the display) to move to the right, and vice versa. As the player who controls an avatar in 414 moves away from the camera, the corresponding avatar will be seen to move to the right, and vice versa. In another videogame, or perhaps later on in the same videogame, the 3D representations 412 and 414 can be combined in a different way, where one is rotated and the other is mirrored. In the mirrored case as a player moves toward their camera, their avatar may unexpectedly move in the opposite direction to the player's expectation. In the rotation case, the rotation can be about any axis including rotating the space up or down as well as side to side. Exactly how the 3D representations are embedded in the game space and what, if any, functions are applied to modify the game space and the data streams depends on the game and the exact point in the game.

Figure 5:
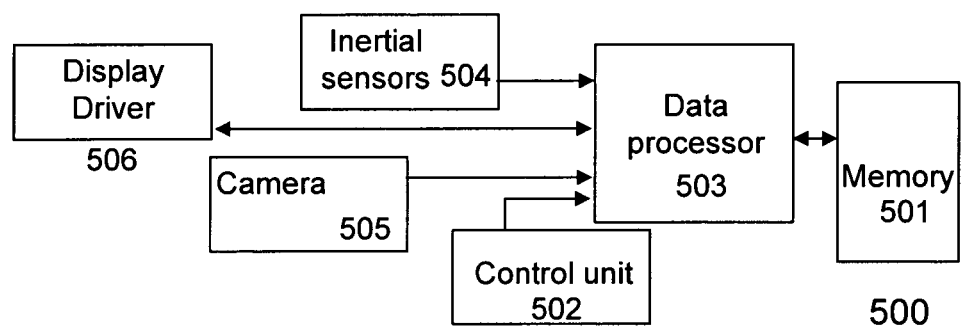
FIG. 5 shows a system configuration 500 according to one embodiment of this invention.

FIG. 5 shows a system configuration 500 according to one embodiment of this invention. The system includes a memory unit 501, one or more controllers 502, a data processor 503, a set of inertial sensors 504, one or more cameras 505, and a display driver 506. There are two types of data, one from the inertial sensors 504 and the other from the camera 505, both are being input to the data processor 503. As described above, the inertial sensors 504 provide sensor data for the data processor 503 to derive up to six degrees of freedom of angular and translational motions with or without the sensor data from the camera 505.

The data processor 503 is configured to display video sequence via the display driver 506. In operation, the data processor 503 executes code stored in the memory 501, where the code has been implemented in accordance with one embodiment of the described invention herein. In conjunction with signals from the control unit 502 that interprets actions of the player on the controller or desired movements of a controller being manipulated by the player, the data processor 503 updates the video signal to reflect the actions or movements. In one embodiment, the video signal or data is transported to a hosting game console or another computing device to create or update a game space that is in return displayed on a display screen via the display driver 506. [TODO: read this section more carefully.]

According to one embodiment, data streams from one or more game consoles are received to derive respective 3D representations of environments surrounding the players. Using augmented reality that is concerned with the use of live video imagery which is digitally processed and "augmented" by the addition of computer-generated graphics, a scene or a game space is created to allow various objects to interact with people or objects represented in the real-world (referred to as representative objects) or other virtual objects. A player may place an object in front of a virtual object and the game will interpret what the object is and respond to it. For example, if the player rolls a ball via the controller towards a virtual object (e.g., a virtual pet), it will jump out of the way to avoid being hurt. It will also react to actions from the player to allow the player to, for example, tickle the pet or clap their hands to startle it.

According to one embodiment, the sensor data is correlated with the image data from the camera to allow an easier identification of elements such as a player's hand in a real-world space. As it may be known to those skilled in the art, it is difficult to track an orientation of a controller to a certain degree of accuracy from the data purely generated from a camera. Relative orientation tracking of a controller may be done using some of the inertial sensors, the depth information from the camera gives the location change that can then be factored out of the readings from the inertial sensors to derive the absolute orientation of the controller due to the possible changes in angular motions.

One skilled in the art will recognize that elements of the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier waves. The computer-readable media can also be distributed over network-coupled computer systems so that the computer-readable code is stored and executed in a distributed fashion.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A method for controlling movements of two or more objects in a shared game space for a networked videogame being played by at least two players separately located from each other, the method comprising:
   receiving in a host machine at least a first video stream from at least a first camera associated with a first location capturing movements of at least a first player at the first location, and a second video stream from at least a second camera associated with a second location capturing movements of at least a second player at the second location;
   modeling from the first and second video streams a first 3D representation of some or all of the first location and a second 3D representation of some or all or the second locations, respectively;
   updating the shared game space to include the first and second 3D representations, virtual objects embedded by the host machine, and representative objects corresponding respectively to the at least first and second players;
   deriving the movements of the first and second players respectively from the first and second video data streams;
   causing at least a first object in the shared game space to respond to the derived movements of the first player and at least a second object in the shared game space to respond to the derived movements of the second player; and
   displaying a depiction of the shared game space on at least one display at each of the first and second locations.

2. The method as recited in claim 1, wherein at least one of the first and second players holds a device as a controller containing one or more inertial sensors, and sensor data from the sensors is combined with one of the first and second video streams to derive the respective movements of the first or second player.

3. The method as recited in claim 1, wherein more video cameras are being set up at the first location to monitor an effective play area in which the movements of the first player are captured, the video cameras produce one or more of full color images, depth image or infrared imaging data.

4. The method as recited in claim 3, wherein the effective play area is defined by one or more of: a field of view of the cameras, optical parameters of the cameras and surrounding lighting condition.

5. The method as recited in claim 1, wherein at least one of the first and second players has a device containing one or more inertial sensors, and sensor data from the sensors is combined with the video streams to derive the respective movements of the first or second player.

6. The method as recited in claim 5, wherein the effective play area goes beyond the field of view of the cameras, the movements of either one of the first and second players falling into a portion of the effective play area beyond the field of view of the camera are tracked by the inertial sensors.

7. The method as recited in claims 6, wherein that device is one or more of:
   hand-held, wearable, or attachable to the human body.

8. The method as recited in claim 6, wherein the device is a hand-held motion-sensitive game controller.

9. The method as recited in claim 1, further comprising:
   embedding gaming rules in the videogame to enable various interactions between the first and second objects, and among the first and second objects and virtual objects.

10. The method as recited in claim 9, further comprising:
    mapping the movements of the first and second players to motions of the first and second objects in accordance with a predefined rule in the videogame.

11. The method as recited in claim 10, wherein the mapping of the movements maps the movements of the first player toward the first camera into the motions of the first object in a particular direction.

12. The method as recited in claim 10, wherein the mapping of the movements maps the movements of the first player and second players so that two corresponding objects in the shared game space move complementarily.

13. The method as recited in claim 10, wherein the mapping of the movements maps the movements of the first player and second players in accordance with a choice made respectively by the first and second players.

14. The method as recited in claim 10, wherein the mapping of the movements maps the movements of either one of the first player and second players towards a camera in a way that a corresponding object is displayed moving left or right on a display.

15. The method as recited in claim 10, wherein the mapping of the movements maps the movements of either one of the first player and second players in a way that a corresponding object moves to avoid a predefined virtual object.

16. The method as recited in claim 10, wherein the mapping of the movements maps the movements of either one of the first player and second players in a way that a 3D humanlike figure moves substantially similar to either one of the first player and second players.

17. The method as recited in claim 10, wherein the mapping of the movements scales the derived movements in a way that small translations in a real-world space correspond to large translations in the shared game space of the videogame, or vice versa.

18. The method as recited in claim 10, wherein the mapping of the movements depends on one or more of game context of the videogame, the player, gaming history or experience of one or more of the first and second players with the videogame.

19. A method for controlling movements of an object in a videogame, the method comprising:
receiving in a computing device at least one video stream from a video camera capturing various movements of a player of the videogame within a field of view of the camera;
modeling from the video stream a 3D representation of a location of the player;
creating a virtual space in the videogame to include the 3D representation, virtual objects embedded by the host machine, and at least a representative object corresponding to the player;
embedding a virtual source of sound in the game space in such a way that the sound the player hears get louder as the representative object corresponding to the player gets closer to the sound source, and vice versa;
deriving the movements of the player from the video data;
deriving the movements of the player from sensor data when the player moves beyond the field of view of the camera, wherein the sensor data is generated from at least one controller being manipulated by the user to interact with the videogame; and
causing the representative object to respond to the movements of the player.

20. The method as recited in claim 19, further comprising:
mapping the movements of the player to motions of the representative object in accordance with a predefined rule in the videogame.

21. The method as recited in claim 20, wherein the motions are scaled so that small translations in a real-world space of the player correspond to large translations in a game space of the videogame, or vice versa.

22. The method as recited in claim 21, wherein the motions are scaled non-linearly so that small movements of the player are mapped almost faithfully, but large movements of the player are damped.

23. The method as recited in claim 21, wherein the motions are mapped to motions of the object depends on one or more of game context of the videogame, the player, gaming history or experience of the player with the videogame.

24. The method as recited in claim 19, wherein the video camera is provided to monitor an effective play area in which the movements of the player are captured.

25. The method as recited in claim 24, wherein the effective play area is defined by one or more of: a field of view of the camera, optical parameters of the camera or surrounding lighting conditions.

26. The method as recited in claim 25, wherein the effective play area goes beyond the field of view of the camera, the movements of the player falling into a portion of the effective play area beyond the field of view of the camera are tracked by inertial sensors in a controller being held by the player.

27. The method as recited in claim 19, further comprising:
embedding gaming rules in the videogame to enable various interactions between the object and other virtual objects, wherein each of the interactions happens as the player manipulates the at least one controller.

28. The method as recited in claim 27, wherein the sensor data is from inertial sensors and used to derive relative translational and angular movements of the at least one controller, both of the sensor data and the video data are combined to derive absolute translational and angular movements of the at least one controller.

29. A system for controlling movements of two or more objects in a shared game space for a networked videogame being played by at least two players remotely located with respect to each other, the system comprising:
at least a first camera and a second camera, respectively, with a first location and a second location, the first camera producing a first video stream capturing movements of at least a first player at the first location, the second camera producing a second video stream capturing movements of at least a second player at the second location;
a designated computing device configured to derive the movements of the first and second players respectively from the first and second video data streams and cause at least a first object in the shared game space to respond to the derived movements of the first player and at least a second object in the shared game space to respond to the derived movements of the second player, wherein the first and second locations are not co-located, wherein the shared game space includes a first 3D representations of some or all of the first location, and a second 3D representation of some or all of the second locations, wherein the shared game space further includes virtual objects embedded by the designated computing device, and at least two representative objects respectively representing the first and second players; and
first and second displays respectively displaying the networked videogame including the shared name space.

30. The system as recited in claim 29, wherein the at least one of the first and second 3D representations is morphed over a course of the networked videogame to create new and interesting scenes for the videogame.

31. The system as recited in claim 30, wherein at least one of the first and second players holds a device containing one or more inertial sensors, and sensor data from the sensors is combined with one of the first and second video streams to derive the movements of the first or second player.

32. The system as recited in claim 29, wherein more video cameras are being set up in the first location to monitor an effective play area in which the movements of the first player are captured.

33. The system as recited in claim 32, wherein the effective play area is defined by one or more of: a field of view of the cameras, optical parameters of the cameras and surrounding lighting conditions.

34. The system as recited in claim 29, wherein at least one of the first and second players has a device containing one or more inertial sensors, and sensor data from the sensors is combined with the video streams to derive the movements of the first or second player.

35. The system as recited in claim 34, wherein the effective play area goes beyond a field of view of the first or second camera, the movements of the first or second player falling into a portion of the effective play area beyond the field of view of the first or second camera are tracked by the inertial sensors.

36. The system as recited in claims 35, wherein the device is one or more of: hand-held, wearable, or attachable to the human body.

37. The system as recited in claim 35, wherein the device is a hand-held motion-sensitive game controller.

38. The system as recited in claim 29, wherein the designated computing device is configured to embed gaming rules in the videogame to enable various interactions between the first and second objects, and among the first and second objects and virtual objects.

39. The system as recited in claim 29, wherein the designated computing device is configured to map the movements of the first and second players to motions of the first and second objects in accordance with a predefined rule in the videogame.

40. The system as recited in claim 29, wherein the designated computing device is configured to map the movements of the first player toward the first camera into the motions of the first object in a particular direction.

41. The system as recited in claim 29, wherein the designated computing device is configured to map the movements of the first player and second players so that two corresponding objects in the shared game space move complimentarily.

42. The system as recited in claim 29, wherein the designated computing device is configured to map the movements of the first player and second players in accordance with a choice made by the first and second players.

43. The system as recited in claim 29, wherein the designated computing device is configured to map the movements of either one of the first player and second players towards a camera in a way that a corresponding object is displayed moving left or right on a display.

44. The system as recited in claim 29, wherein the designated computing device is configured to map the movements of either one of the first player and second players in a way that a corresponding object moves to avoid a predefined virtual object.

45. The system as recited in claim 29, wherein the designated computing device is configured to map the movements of either one of the first player and second players in a way that a 3D human-like figure moves substantially similar to either one of the first player and second players.

46. The system as recited in claim 29, wherein the designated computing device is configured to scale the derived movements in a way that small translations in a real-world space correspond to large translations in the shared game space of the videogame, or vice versa.

47. The system as recited in claim 29, wherein the designated computing device is configured to map the movements in accordance with one or more of game context of the videogame, the player, gaming history or experience of one or more of the first and second players with the videogame.

48. A system for controlling movements of an object in a videogame, the system comprising:
at least a video camera capturing various movements of a player of the videogame;
a designated device receiving at least one video stream from the video camera to derive the movements of the player from the video data, and cause the object to respond to the movements of the player, the designated device being configured to further model a 3D representation of a play area in which the player is interacting with the videogame, wherein the videogame includes a virtual space including some or all of the 3D representation, virtual objects embedded by the designed device, and at least a representative object corresponding to the player, embed a virtual source of sound in the game space in such a way that the sound the player hears get louder as the representative object corresponding to the player gets closer to the sound source, and vice versa.

49. The system as recited in claim 48, wherein the designated device is configured to map the movements of the player to motions of the object in accordance with a predefined rule in the videogame.

50. The system as recited in claim 48, wherein the motions are scaled so that small translations in a real-world space of the player correspond to large translations in a game space of the videogame, or vice versa.

51. The system as recited in claim 48, wherein the motions are scaled non-linearly so that small movements of the player are mapped almost faithfully, but large movements of the player are damped.

52. The system as recited in claim 48, wherein a predefined rule in the videogame depends on one or more of game context of the videogame, the player, gaming history or experience of the player with the videogame.

53. The system as recited in claim 48, wherein the video camera is provided to monitor an effective play area in which the movements of the player are captured.

54. The system as recited in claim 53, wherein the effective play area is defined by one or more of: a field of view of the camera, optical parameters of the camera and surrounding lighting conditions.

55. The system as recited in claim 54, wherein the effective play area goes beyond the field of view of the camera, the movements of the player falling into a portion of the effective play area beyond the field of view of the camera are tracked by inertial sensors in a controller being held by the player.

56. The system as recited in claim 48, wherein the designated device is configured to embed gaming rules in the videogame to enable various interactions between the object and other virtual objects, each of the interactions happens as the player manipulates at least a controller including inertial sensors.

57. The system as recited in claim 56, wherein sensor data from the inertial sensors is used to derive relative translational and angular movements of the controller, both of the sensor data and the video data are combined to derive absolute translational and angular movements of the controller.

* * * * *